United States Patent [19]

Mauldin et al.

[11] 4,295,958

[45] Oct. 20, 1981

[54] REFORMING WITH MULTIMETALLIC CATALYSTS

[75] Inventors: Charles H. Mauldin; William C. Baird, Jr., both of Baton Rouge, La.

[73] Assignee: Exxon Research & Engineering Co., Florham Park, N.J.

[21] Appl. No.: 168,492

[22] Filed: Jul. 14, 1980

Related U.S. Application Data

[62] Division of Ser. No. 29,675, Apr. 13, 1979, Pat. No. 4,251,391.

[51] Int. Cl.³ .............................................. C10G 35/09
[52] U.S. Cl. ..................................... 208/138; 208/139
[58] Field of Search ................................ 208/138, 139

[56] References Cited

U.S. PATENT DOCUMENTS

| | | | |
|---|---|---|---|
| 3,415,737 | 12/1968 | Kluksdahl | 252/466 PT |
| 3,729,408 | 4/1973 | Carter et al. | 252/474 |
| 3,801,498 | 4/1974 | Rausch | 252/441 |
| 3,933,622 | 1/1976 | Mitchell et al. | 252/439 |
| 4,043,944 | 8/1977 | Juquin et al. | 208/139 |
| 4,049,578 | 9/1977 | Reagan et al. | 208/139 |
| 4,085,157 | 4/1978 | Juquin et al. | 208/139 |
| 4,149,962 | 4/1979 | Antos et al. | 252/441 |

*Primary Examiner*—Curtis R. Davis
*Attorney, Agent, or Firm*—Llewellyn A. Proctor

[57] ABSTRACT

A catalyst constituted of a composite which includes hydrogenation-dehydrogenation components comprised of platinum and rhenium to which a small amount of copper is added to suppress hydrogenolysis, which is particularly acute in reforming during the early period of operation when the catalyst is placed on stream, i.e., at the startup of a reactor; and process of employing such catalyst in reforming.

23 Claims, No Drawings

REFORMING WITH MULTIMETALLIC CATALYSTS

This is a division of application Ser. No. 029,675, filed Apr. 13, 1979, now U.S. Pat. No. 4,251,391.

BACKGROUND OF THE INVENTION AND PRIOR ART

Catalytic reforming, or hydroforming, is a process well known to the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is cocurrently passed sequentially through a reheat furnace and then to the next reactor of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. The platinum group metals (ruthenium, osmium, rhodium, iridium, palladium and platinum), particularly platinum, have been widely used in commercial reforming operations, these metals being composited with an inorganic oxide base, particularly alumina; and in recent years promoters such as iridium, rhenium, germanium, tin, etc., have been added, particularly to platinum, to enhance one or more of certain of the characteristics which a good reforming catalyst must possess—viz, activity, selectivity, activity maintenance and yield stability. Rhenium has been found particularly useful in providing excellent $C_5+$ liquid yields and stability. Halogen, e.g., chlorine, is generally added to provide the required acid function.

The principal reactions produced in reforming are dehydrogenation of naphthenes to produce the corresponding aromatic hydrocarbons; isomerization of n-paraffins to form branched-chain paraffins and isomerization of ring compounds, and dehydrogenation of the latter to form aromatics; dehydrocyclization of paraffins to form aromatics; and hydrocracking of high molecular weight feed constituents to form lower molecular weight, or lower boiling, constituents, the net effect of these reactions being to increase the concentration of aromatics and isomers, with consequent octane improvement of naphthas boiling within the gasoline range. Hydrogenolysis, however, a specific and severe form of hydrocracking which produces methane, can also occur; and hydrogenolysis is particularly acute in reforming with platinum-rhenium catalyst, particularly fresh or regenerated, reactivated platinum-rhenium catalysts, which are particularly hypersensitive.

During hydrogenolysis, exotherms or heat fronts are produced which pass through a catalyst bed at startup, i.e., when a new or freshly regenerated, reactivated platinum-rhenium catalyst is initially contacted with hydrocarbons at reforming temperatures. The temperature excursions or heat fronts are undesirable because the excessive heat often damages the catalyst, or causes excessive coke laydown on the catalyst with consequent catalyst deactivation and, if uncontrolled, may even lead to damage to the reactor and reactor internals. The phenomenon is troublesome in any type of reforming operation, but is particularly troublesome in cyclic reforming wherein one reactor of the series is a swing reactor which is used as a substitute for each of the other reactors so that the catalyst of each in turn can be regenerated, and reactivated. Because of the frequency with which the catalysts must be regenerated in cyclic reforming, as contrasted with other types of reforming units, hydrogenolysis greatly reduces the efficiency of the cyclic reforming process and simply cannot be tolerated.

Hydrogenolysis can be moderated by sulfiding, and consequently it is conventional to presulfide such catalysts prior to their use in reforming. Typically, the catalyst is charged into a reactor and then contacted with an admixture of hydrogen sulfide and an inert gas, e.g., nitrogen. Unfortunately, however, whereas sulfiding moderates the type of cracking which suppresses methane formation it does little to reduce the formation of other gaseous $C_2+$ hydrocarbons, e.g., ethane, propane, butane and the like. This type of cracking too can cause the catalysts to become rapidly overheated when exposed, in the presence of hydrogen, at normal reaction conditions to hydrocarbons, to such extent that the catalyst itself can be overheated, sintered or otherwise damaged. Moreover, in sulfiding the catalyst special care must be taken to avoid oversulfiding because platinum-rhenium catalysts pose an acute sensitivity to feed sulfur which can drastically reduce the activity and selectivity of the catalyst; and, an excessive amount of deposited catalyst sulfur can find its way into the feed.

It is accordingly a primary objective of the present invention to obviate these and other prior art deficiencies, particularly by providing a new and improved catalyst, and process for utilizing such catalyst for upgrading naphthas by reforming to produce higher octane gasolines.

A more particular object is to provide a new and improved cyclic reforming process for effecting, at suitable reforming conditions, the production of high octane gasolines while minimizing hydrogenolysis and other type of hydrocracking which tend to produce methane and hydrocarbon gases of higher molecular weight than methane, especially when employing rhenium-containing catalysts, notably platinum-rhenium catalysts.

A yet more particular object is to provide less sulfur sensitive platinum-rhenium catalysts which require less rigorous feed sulfur specifications.

These and other objects are achieved in accordance with the present invention embodying a catalyst comprised of platinum, rhenium, and halogen composited with an inorganic oxide support, or carrier, to which a small concentration of copper is added to improve the yield and stability of the catalyst in reforming, as contrasted with a platinum-rhenium catalyst otherwise similar except that the catalyst does not contain any copper. In its preferred aspects the catalyst also contains a sulfur component.

The catalyst is one which contains platinum as an essential component, generally in concentration ranging from about 0.1 percent to about 2 percent, preferably from about 0.2 percent to about 0.6 percent, based on the weight of the catalyst (dry basis). The catalyst also contains rhenium as an essential component, generally in concentration ranging from about 0.1 percent to about 2 percent, preferably from about 0.2 percent to about 0.6 percent, based on the weight of the catalyst (dry basis). Preferably, the platinum and rhenium are employed in weight ratios of platinum:rhenium ranging from about 0.25:1 to about 3:1, more preferably from about 0.75:1 to about 1.25:1; and most preferably is employed in substantially equal weight ratios when the total content of these metals ranges from about 0.4 percent to about 1 percent, based on the total weight of the catalyst (dry basis).

Halogen is an essential component, the halogen content of the catalyst generally ranging from about 0.1 to about 2.5 percent, preferably from about 0.7 to about 1.2 percent, based on the weight of the catalyst (dry basis).

Sulfur is a highly preferred component, the sulfur content of the catalyst generally ranging to about 0.2 percent, preferably from about 0.05 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at from about 350° F. to about 1050° F. at about 1–40 atmospheres for the time necessary to achieve breakthrough, or the desired sulfur level.

Copper is an essential component, and the present invention is based on the discovery that excessive hydrogenolysis can be eliminated by the use of small and critical concentrations of copper; and that added benefits can be obtained by the further addition of sulfur to the catalyst to suppress other types of hydrocracking which produces $C_2^+$ gaseous hydrocarbons. The copper component is conveniently added to the catalyst by impregnation. Suitably, a sufficient amount of a copper-containing compound is added to incorporate from about 0.01 to about 0.1 percent copper, preferably from about 0.025 to about 0.08 percent copper, based on the weight of the catalyst (dry basis). Preferably also, the copper is composited with the catalyst in amount sufficient to provide a molar ratio of copper:(platinum plus rhenium) ranging from about 0.02:1 to about 0.25:1, preferably from about 0.04:1 to about 0.20:1. The exact concentration of the copper depends to some extent on the nature of the feedstock and reforming conditions, but it is important that the concentration of copper on the catalyst be controlled to the proper level. High concentration of copper acts as a poison and depresses catalyst activity.

While the catalyst may be used directly, it is preferred that it be sulfided to achieve the ultimate suppression of hydrocracking during reforming. Sulfur eliminates principally the formation of excessive methane, and copper eliminates principally the formation of the $C_2^+$ hydrocarbon gases. Together, however, a given amount of both copper and sulfur prove superior in the suppression of total hydrocracking than a corresponding amount of either copper or sulfur employed individually.

The several components of the catalyst are composited with a refractory inorganic oxide support material, particularly alumina. Suitably, the copper is added first to the support, and subsequently the metal hydrogenation-dehydrogenation components are added. The halogen component, particularly chlorine, is added along with the hydrogenation-dehydrogenation components, or subsequent thereto, or both. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g., preferably from about 100 to about 300 m$^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The metal hydrogenation-dehydrogenation components can be composited or intimately associated with the porous inorganic oxide support or carrier by various techniques known to the art such as ion-exchange, co-precipitation with the alumina in the sol or gel form, and the like. For example, the catalyst composite can be formed by adding together suitable reagents such as a salt of the required metals and ammonium hydroxide or ammonium carbonate, and a salt of aluminum such as aluminum chloride or aluminum sulfate to form aluminum hydroxide. The aluminum hydroxide containing the salts can then be heated, dried, formed into pellets or extruded, and then calcined in nitrogen or other non-agglomerating atmosphere. The metal hydrogenation-dehydrogenation components are preferably added to the catalyst by impregnation, typically via an "incipient wetness" technique which requires a minimum of solution so that the total solution is absorbed, initially or after some evaporation.

Suitably, the copper, and metal hydrogenation-dehydrogenation components are deposited on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

In compositing the metals with the carrier, essentially any soluble compound of the respective metal can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. In adding the copper, copper chlorides and nitrate are a preferred source of copper on the basis of availability, cost and effectiveness.

The copper is incorporated into the catalyst at the time of its formation, or immediately thereafter, and preferably the copper is incorporated into the preformed carrier by impregnation from a solution of a soluble salt, or compound of copper; preferably in a solution of hydrochloric acid to provide good distribution of the copper. This step is carried out prior to the impregnation of the hydrogenation-dehydrogenation components. The copper, in accordance with this invention, can be added to the carrier from a solution which contains a salt, or compound of copper, and thereafter the copper impregnated support can be dried, calcined, and the hydrogenation-dehydrogenation components then added, suitably as salts or compounds dissolved in a suitable solvent, preferably water, to form a solution.

The impregnation of the platinum and rhenium components into a carrier is carried out by impregnating the carrier with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. In other words, copper is added initially using conventional techniques, and then the other metals are added simultaneously or sequentially, suitably by impregnation. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures.

In a preferred embodiment of the present invention a carrier is impregnated with an aqueous halogen-acid solution of the copper. Exposure to a halogen acid can introduce substantially high levels of halogen into the carrier which is not desirable because subsequent metal impregnation is inhibited, and the catalyst can produce high acid cracking in reforming. However, excess halogen can be readily removed from the acid treated carrier by neutralization with ammonium hydroxide, suitably by contact at ambient temperature for periods ranging about 0.1 to about 1 hour, at strengths ranging from about 0.1 N to about 15 N, preferably from about 0.1 N to about 5 N. These treatments are followed by evaporation or filtration and then drying or calcination, or both, and then the metals impregnated catalyst can be further impregnated with a solution containing a dissolved salt or compound of platinum and rhenium, or platinum, rhenium and additional metals, followed by evaporation or filtration, with subsequent drying or calcination, or both, whereby the components are dispersed substantially uniformly to the inner part of the catalyst.

As suggested, a halogen component is also required. Fluorine and chlorine are preferred halogen components. The halogen is contained on the catalyst in concentration ranging from about 0.1 percent up to about 2.5 percent, preferably within the range of about 0.7 to about 1 percent, based on the weight of the catalyst. The introduction of halogen into catalyst can be carried out by any method and at any time of the catalyst preparation, for example, prior to, following or simultaneously with the impregnation of the copper, platinum and rhenium components. In the usual operation, the halogen component is introduced simultaneously with the incorporation of these metal components. It can also be introduced by contacting a carrier material in a vapor phase or liquid phase with a halogen compound such as hydrogen fluoride, hydrogen chloride, ammonium chloride, or the like.

The catalyst, after impregnation, is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The catalyst can be activated by contact with air at temperatures ranging from about 500° F. to about 1050° F. for periods ranging from about 1 to about 24 hours in either flowing or static air. Reduction is performed by contact with flowing hydrogen at temperatures ranging from about 350° F. to about 1050° F. for periods ranging from about 0.5 to about 24 hours at about 1–40 atm. The catalyst can be sulfided by use of a blend of $H_2S/H_2$ and performed at temperature ranging from about 350° F. to about 1050° F. at about 1–40 atm. for a time necessary to achieve breakthrough, or the desired sulfur level. Post-sulfiding stripping can be employed if desired at conditions similar to those for reduction of the catalyst.

Treatment of the catalyst with a mixture of chlorine and oxygen can be substituted for air activation if desired. This procedure can correct for any possible maldistribution of the metals arising from improper impregnation, and the procedure is useful in restoring activity during regeneration-rejuvenation after on oil service. A blend of chlorine, oxygen and nitrogen can also be employed at temperatures ranging from about 350° F. to about 1050° F. for periods ranging from about 1 to about 24 hours at 1–40 atm. Treat times for these various operations are a function of gas flow rates, gas compositions, and conditions. The catalyst halide content can be controlled during impregnation, or adjusted by treatment with water or water-hydrogen chloride blends.

This catalyst can be used in semi-regenerative, cyclic, semicyclic, or continuous bed reforming. The catalyst is particularly useful at severe reforming conditions, especially at low pressures, or pressures ranging from about 50 psig to about 150 psig, where maximum yield is favored.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes falling within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
| --- | --- | --- |
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |

| Major Operating Variables | Typical Process Conditions | Preferred Process Conditions |
|---|---|---|
| Feed Rate, W/Hr/W | 0.5–10 | 1–3 |

The invention will be more fully understood by reference to the following demonstrations and examples which present comparative data illustrating its more salient features. All parts are given in terms of weight except as otherwise specified.

EXAMPLES

A commercial platinum-rhenium catalyst (Catalyst A) of the following weight percent composition was dried and activated by contact with air at 1000° F. for 3½ hours. A sample was charged to a quartz reactor and reduced in flowing $H_2$ at 932° F. for 1 hour at 600 cc/min. The catalyst was breakthrough sulfided using 0.2 Vol. % $H_2S$ in $H_2$ at 932° F. and 600 cc/min. The catalyst was then treated with $H_2$ at 932° F. for 2 hours at 600 cc/min. The composition of the catalyst is given in Table I.

Catalyst B was prepared from a portion 1/16" high purity gamma alumina extrudates by calcining same in air at 1000° F. for 4 hours. The extrudates were impregnated overnight with a stock solution of cuprous chloride in 1 M hydrochloric acid. The extrudates were washed with water and soaked in ammonium hydroxide solution for 1 hour to remove excess chloride. After washing with water the extrudates were impregnated with an aqueous solution of chloroplatinic acid, perrhenic acid, and hydrochloric acid using $CO_2$ as an impregnation aid. The catalyst was air-dried and then dried in vacuum at 130° F. overnight. The catalyst was air activated and reduced. The composition of the unsulfided catalyst is given in Table I.

In the preparation of Catalyst C, a portion of Catalyst B was air activated, reduced, sulfided, and stripped as described for Catalyst A. The composition of Catalyst C is as given in Table I.

TABLE I

| Components | Catalyst A | Catalyst B | Catalyst C |
|---|---|---|---|
| Platinum | 0.3% | 0.32% | 0.32% |
| Rhenium | 0.3% | 0.23% | 0.23% |
| Chlorine | 0.93% | 0.93% | 0.90% |
| Copper | — | 0.05% | 0.05% |
| Sulfur | 0.084% | — | 0.08% |
| Alumina | 97.5% | 98.5% | 98.4% |

The catalysts were each then contacted at reforming conditions in separate runs with heptane with the results given in Table II.

TABLE II

Heptane Reforming
932° F., 100 psig, 10 W/H/W, $H_2$/heptane = 5

| Catalyst | Yield, Wt. % | | |
|---|---|---|---|
| | $C_1$ | $C_2$-$C_4$ | $C_5^+$ |
| A (Pt—Re—S) | 1.5 | 21.4 | 77.1 |
| B (Pt—Re—Cu) | 1.6 | 15.3 | 83.1 |
| C (Pt—Re—Cu—S) | 1.0 | 15.9 | 83.1 |

These data show that traditional sulfiding controls methane formation but has little impact on other hydrocracking products. The simple substitution of copper for sulfur provides control of all hydrogenolysis processes and affords higher liquid yields. The use of copper and sulfur together is superior to sulfiding alone, but the yield and stability credits arising from copper-sulfur synergism are not apparent with this simple feed.

In further tests, Catalysts A and C were used to reform a petroleum naphtha. Catalyst C, which contains both copper and sulfur, as will be shown, provides both yield and activity credits relative to Catalyst A, the basic Pt-Re catalyst.

In conducting the run with Catalysts A and C, a low sulfur paraffinic naphtha having the inspections given in Table III was employed.

TABLE III

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No., RON Clear | 34.8 |
| Gravity, °API | 59.7 |
| Sulfur, Wt. ppm | <0.1 |
| Water, Wt. ppm | ~7 |
| Chlorine, Wt. ppm | <0.1 |
| Analysis, Vol. Percent | |
| Paraffins | 69.51 |
| Naphthenes | 18.48 |
| Aromatics | 12.01 |

The reforming run was carried out at conditions required to produce a 100 RON liquid product, i.e., at 930° F., 200 psig, 5000 SCF/Bbl and 1.4 W/Hr/W. The results are given in Table IV.

TABLE IV

Reforming of Low Sulfur Paraffinic Feed
930° F., 200 psig, 5000 SCF/B, 1.4 W/H/W

| Catalyst | Relative Activity (400 hr.) | $C_5^+$ LV% at 100 RON (400 hr.) |
|---|---|---|
| A (Pt—Re—S) | 1.0 | 71.8 |
| C (Pt—Re—Cu—S) | 1.2 | 74.3 |

Catalyst C was again used to reform said petroleum naphtha at more severe conditions. The catalyst again provided excellent yield and activity stability at the severe conditions as given in Table V.

TABLE V

Cyclic Reforming of Low Sulfur Paraffinic Feed
950° F., 175 psig, 3000 SCF/B, 2.5 W/H/W

| Hr. on Oil | Relative Activity | $C_5^+$ LV% at 100 RON |
|---|---|---|
| 24 | 1.9 | 74.7 |
| 72 | 1.7 | 75.3 |
| 145 | 1.4 | 74.9 |
| 240 | 1.0 | 73.7 |

These data show that yield and activity stability are improved over cycle lengths six times that of conventional catalysts. Yield stability was maintained for a period ten times that normally employed.

Catalyst C was again used to reform the low sulfur paraffinic feed at 932° F., 100 psig, 5000 SCF/B, 1.4 W/H/W, as given in Table VI. These data clearly illustrate the improved activity and yield stability of the catalyst under even the severe conditions of low pressure reforming.

TABLE VI

| | Low Pressure Reforming of Low Sulfur Paraffinic Feed 932° F., 100 psig, 5000 SCF/B, 1.4 W/H/W | |
|---|---|---|
| Catalyst | Relative Activity (400 Hr.) | $C_5{}^+$ LV% at 100 RON (400 Hr.) |
| A (Pt—Re—S) | 1.0 | 75.8 |
| C (Pt—Re—Cu—S) | 1.3 | 78.3 |

It is apparent that various modifications and changes can be made without departing from the spirit and scope of the present invention, the outstanding features of which are that hydrogenolysis can be suppressed and that yield and activity maintenance can be improved even at high severity conditions.

Having described the invention, what is claimed is:

1. A process for reforming a hydrocarbon feed at reforming conditions which comprises contacting said feed with a catalyst which consists essentially of from about 0.1 to about 2 percent platinum, from about 0.1 to about 2 percent rhenium, and from about 0.01 to about 0.1 percent copper composited with an inorganic oxide support.

2. The process of claim 1 wherein the catalyst contains from about 0.2 to about 0.6 percent platinum.

3. The process of claim 1 wherein the catalyst contains from about 0.2 to about 0.6 percent rhenium.

4. The process of claim 1 wherein the catalyst contains from about 0.025 to about 0.08 percent copper.

5. The process of claim 1 wherein the catalyst contains from about 0.2 to about 0.6 percent platinum, from about 0.2 to about 0.6 percent rhenium, from about 0.025 to about 0.08 percent copper, and wherein the copper is composited with the catalyst in amount sufficient to provide a molar ratio of copper:(platinum plus rhenium) ranging from about 0.02:1 to about 0.25:1.

6. The process of claim 1 wherein the catalyst contains from about 0.1 to about 2.5 percent halogen.

7. The process of claim 6 wherein the catalyst contains from about 0.7 to about 1.2 percent halogen.

8. The process of claim 1 wherein the catalyst is sulfided, and contains to about 0.2 percent sulfur.

9. The process of claim 8 wherein the catalyst contains from about 0.05 to about 0.1 percent sulfur.

10. The process of claim 1 wherein the catalyst contains from about 0.2 to about 0.6 percent platinum, from about 0.2 to about 0.6 percent rhenium, and from about 0.025 to about 0.08 percent copper.

11. The process of claim 10 wherein the catalyst contains from about 0.7 to about 1.2 percent halogen.

12. The process of claim 10 wherein the catalyst is sulfided, and contains from about 0.05 to about 0.1 percent sulfur.

13. The process of claim 10 wherein the catalyst contains platinum and rhenium in weight ratio platinum:rhenium ranging from about 0.25:1 to about 3:1.

14. The process of claim 13 wherein the catalyst contains platinum and rhenium in weight ratio platinum:rhenium ranging from about 0.75:1 to about 1.25:1.

15. The process of claim 1 wherein the catalyst contains copper in molar ratio of copper:(platinum plus rhenium) ranging from about 0.02:1 to about 0.25:1.

16. The process of claim 15 wherein the molar ratio of copper:(platinum plus rhenium) ranges from about 0.04:1 to about 0.20:1.

17. The process of claim 5 wherein the molar ratio of copper:(platinum plus rhenium) ranges from about 0.04:1 to about 0.20:1.

18. The process of claim 5 wherein the catalyst is sulfided, and contains up to about 0.2 percent sulfur.

19. The process of claim 18 wherein the catalyst contains from about 0.05 to about 0.1 percent sulfur.

20. The process of claim 1 wherein the catalyst contains from about 0.2 to about 0.6 percent platinum, from about 0.2 to about 0.6 percent rhenium, from about 0.025 to about 0.08 percent copper, and the copper is composited with the catalyst in amount sufficient to provide a molar ratio of copper:(platinum plus rhenium) ranging from about 0.02:1 to about 0.25:1, and the catalyst contains from about 0.1 to about 2.5 percent halogen, and up to about 0.2 percent sulfur.

21. The process of claim 20 wherein the catalyst contains from about 0.7 to about 1.2 percent halogen, and from about 0.05 to about 0.1 percent sulfur.

22. The process of claim 20 wherein the catalyst contains platinum and rhenium in weight ratio platinum:rhenium ranging from about 0.25:1 to about 3:1.

23. The process of claim 18 wherein the catalyst contains platinum and rhenium in weight ratio platinum:rhenium ranging from about 0.75:1 to about 1.25:1.

* * * * *